C. Jillson.
Wire-Pointing Mach.
No. 3,476. Reissued Jun. 1, 1869.
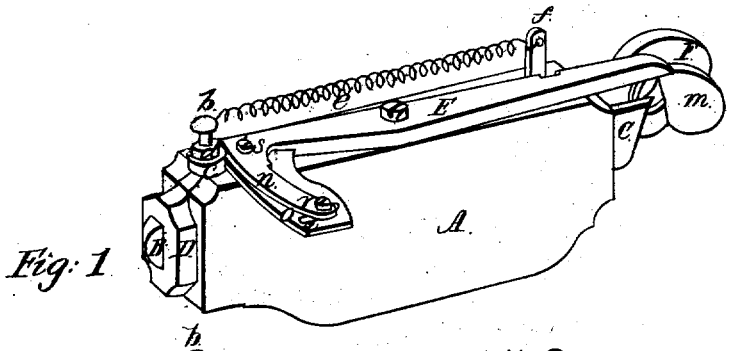
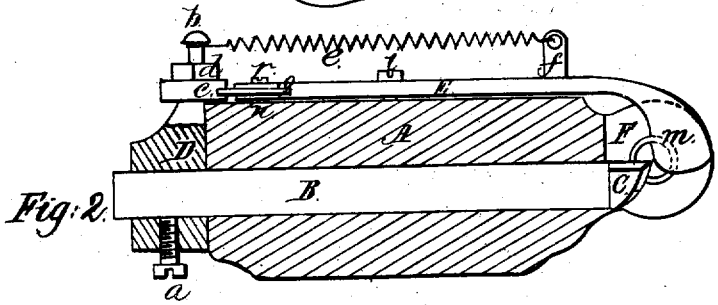
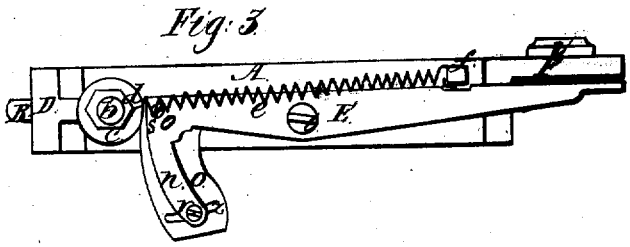
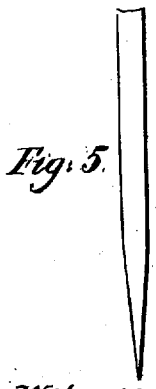
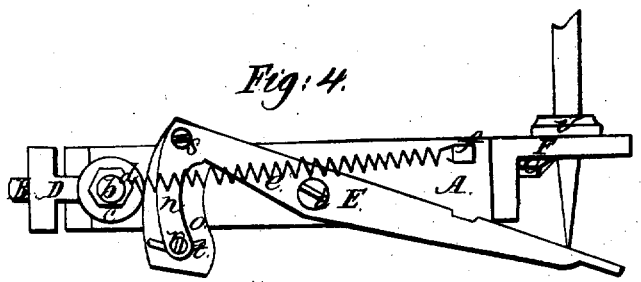
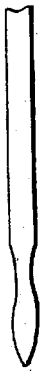
Witnesses:
Thos. H. Dodge
Geo. H. Miller
Inventor:
C. Jillson.
N. PETERS, PHOTO-LITHOGRAPHER, WASHINGTON, D. C.

United States Patent Office.

C. JILLSON, OF WORCESTER, MASSACHUSETTS.

*Letters Patent No.* 18,205, *dated September* 15, 1857; *reissue No.* 3,476, *dated June* 1, 1869.

DIVISION B.

IMPROVED METHOD OF FORMING CONICAL POINTS ON WIRES, RODS, &c.

The Schedule referred to in these Letters Patent and making part of the same.

*Know all men by these presents:*

That I, C. JILLSON, of the city and county of Worcester, and Commonwealth of Massachusetts, have invented a certain new and improved Process or Method of Turning or Pointing Wire-Blanks; and I do hereby declare that the following is a full, clear, and exact description of the same, reference being had to the accompanying drawings, forming a part of this specification, and in which—

Figure 1 represents a perspective view of so much of the machine as is necessary to illustrate my present improvements;

Figure 2 represents a longitudinal vertical section through the parts of machine shown in fig. 1;

Figure 3 represents a top or plan view of the parts in one position;

Figure 4 represents a top or plan view of the parts as they appear during the operation of turning the point, or taper upon the end of a piece of wire;

Figure 5 represents a side view of a section of a piece of wire after its end has been turned to a regular taper; and Figure 6 represents a similar view of a piece of wire, the end of which has been turned to an irregular taper.

To enable those skilled in the art to which my invention belongs, to make and use the same, I will describe it more in detail.

The nature of my invention, which forms the subject-matter of this division of reissue, relates to a method of making tapered wire-blank, as will be hereafter explained.

Pieces of wire, as pointed, or tapered heretofore for pins or other similar articles, have been dressed, or tapered from the body to the point, while my improved tapered wire-blanks are cut, or turned from the point to the body, thus reversing the general operation.

The machine hereafter described illustrates one good mode of carrying out my improved process or method, and it is evident that it may be carried out in any other proper manner.

In the drawings—

A represents a case, or stock, through a square mortise in which passes the shank B, of the cutting-tool C, which protrudes, or project therefrom, as seen in figs. 1 and 2.

This shank B is made to fit snugly in the mortise in the case, but not so tight but that it can be moved in the mortise, to draw the cutter C from the wire that is being pointed, or allow it to approach the same after having been so drawn from it.

On the part of the shaft B which projects from the case A, is fitted a piece, D, which is held to the shank by a set-screw, *a*, or otherwise; and in the top of this piece D there is a pin, or standard, *b*, upon which is placed a friction-roll, *c*, which is held in place by a nut, *d*.

One end of a coiled spring, *e*, is fastened to the pin, or standard *b*, while the other end of said spring is connected to the stud *f*, which projects up from the case A.

The spring *e* is for drawing back the cutter after it has been forced into the case, or stock A, and for holding it out, while the piece D serves to regulate the distance, or extent to which the cutter can project from said case, or stock.

On top of the stock, or case A, is pivoted, at *i*, a lever, or pattern-frame, E, the forward end of which is bent downward, and flattened out, as seen at *m*, figs. 1 and 2, and the rear end of said lever, or frame has an arm, *n*, upon it, which may be slotted, so as to receive a pattern, or plate, *o*, which designates, or governs the form of the point, or taper to be made.

This pattern, or plate, has a slot, 2, in one of its ends, through which, and through the arm *n*, passes a set-screw, *r*, the other end of the said pattern, or plate *o*, being held in place by the pivot, or screw *s*, whereby said pattern can be adjusted and held close up against the friction-roll *c*.

In a projecting piece, F, of the case, or stock A, is screwed an eye, or rest, *v*, the opening in which should be of the diameter of the piece of wire to be pointed, or turned, and this eye should be removable, so as to make the machine capable of pointing wires of different sizes, the shape of the point being determined by the pattern, or plate *o*, heretofore described.

The instrument or machine above described should or may be fastened to the "dead-spindle" of a lathe, in such a manner as to have the centre of the hole in the eye, or rest *v*, and the point of the cutter, when projected out to its full extent, exactly in line with the centre of the "live-spindle," in the head of the lathe.

One end of the piece of wire to be pointed is then fastened in the end of the "live-spindle," in any suitable manner, and said spindle set in motion, thereby giving to said piece of wire a rotary motion upon an axis in line with the point of cutter C and the centre of the hole in the eye, or rest *v*.

The spindle to which the pointing-instrument or machine is fastened, or secured, is now pressed toward the head-piece of the lathe, whereby the eye, or rest *v* is forced over the end of the piece of wire to be pointed, which should fill the hole in said eye, or rest.

The end of the wire, as it passes through the eye, or rest, is turned, or cut to a point by the cutter, which fits close up to the back of the rest, as shown in the drawings.

As the dead-spindle is moved in, thereby causing the rest, or eye to precede the cutting-tool, for supporting in a central position the unturned, or untapered part of the blank, as it is approached by the cutting-tool, the point of the wire, in this instance, as it passes the cutter, presses against the flat part *m* of the lever, or pattern-frame F, and forces it away from the cutting-tool, or, rather, prevents that end from moving forward with the rest of the cutting, pointing, or tapering-apparatus, thereby causing said pattern-frame to turn on its pivot *i*, thus bringing the edge of the plate, or pattern *o* against the friction-roll *c*, on the stud *b*, which forces said roll back against the action of the spring *e*, and, as stud *b* is fastened to the shank B of the cutter, it forces said shank back, and thus drawing the cutter gradually away from the wire, thereby turning, tapering, or pointing the end of the wire, as shown in fig. 4 of the drawings.

In fig. 5, a section of a piece of wire is shown, which has been thus pointed, or tapered.

It will be noticed that the action of the cam, or pattern, modifies, or regulates the taper of the point.

The edge of the plate, or pattern *o*, shown in contact with the friction-roll, having a regular outline, modifies, or regulates the motion of the cutting-tool, so that a regular taper is formed, as above described, while the other, or opposite edge of the pattern, being irregular, would so modify, control, or regulate the motion of the cutter, that an irregular form would be turned, as shown in fig. 6 of the drawings, and said plate, or pattern may be turned over for that purpose; besides, by turning the pattern, or plate *o* on its pivot *s*, and then securing it in such adjustable position, the length of taper may be changed as desired.

Thus it will be seen, that by this machine different-sized wires may be turned and tapered, different tapers may be given, and different forms may be produced, and that, too, while the end of the wire turned is always on a line with the centre of the blank, thereby producing a turned and tapered blank, which is an improved article of manufacture, and which does not have to be ground in order to produce uniformity of shape.

This physical characteristic of the turned blank is due to the rest, or supporting-eye, which precedes the cutting-tool and holds the unturned part of the blank in a true and central position as the cutting-tool approaches such part, as before explained.

Although the operation of pointing wire is a very delicate one, so much so that it is almost if not impossible to dress them accurately by the old modes of grinding, or dressing from the body to the point, my improved blank, although produced very rapidly, is, nevertheless, very perfect and uniform.

By reference to fig. 6 of the drawings, it will be seen that a tapered shoulder may be formed at same distance from the end of the blank, while such end may be turned in any desired tapering form, or with parallel sides.

A tapered shoulder may also be formed, by commencing on the outer surface of the blank, and running toward the centre thereof. In this last case, the end of the wire would be projected through the eye, or rest, some distance beyond the cutter, before the tapering-operation would commence.

Having described my improved tapered wire-blank,

What I claim therein as new, and of my invention, and desire to secure by Letters Patent, is—

The process or method, herein described, by which a conical point is formed upon wire and analogous articles, namely, by adjusting the tool so as to commence the apex of the cone, or point, in the axial line of the wire, and turning the metal therefrom, in a continuously-increasing circle, until the base of the intended cone is reached, and the point formed, substantially in the manner set forth.

C. JILLSON.

Witnesses:
THOS. H. DODGE,
GEO. H. MILLER.